United States Patent [19]
Burgdorf et al.

[11] 4,241,812
[45] Dec. 30, 1980

[54] BRAKE SHOE FOR A SPOT-TYPE DISC BRAKE

[75] Inventors: Jochen Burgdorf, Offenbach; Hans-Henning Lüpertz, Darmstadt; Helmut Kast, Frankfurt am Main, all of Fed. Rep. of Germany

[73] Assignee: ITT Industries, Inc., New York, N.Y.

[21] Appl. No.: 965,957

[22] Filed: Dec. 4, 1978

[30] Foreign Application Priority Data

Dec. 12, 1977 [DE] Fed. Rep. of Germany ....... 2755325

[51] Int. Cl.³ .............................................. F16D 65/04
[52] U.S. Cl. ................................ 188/73.1; 188/250 B
[58] Field of Search ..................... 188/73.1, 73.5, 370, 188/250 B, 250 E, 205 A

[56] References Cited
U.S. PATENT DOCUMENTS

| | | | |
|---|---|---|---|
| 3,638,765 | 2/1972 | Flaherty et al. | 188/73.5 |
| 3,848,708 | 11/1974 | Noguchi | 188/73.1 |

FOREIGN PATENT DOCUMENTS

| | | |
|---|---|---|
| 7537546 | 3/1976 | Fed. Rep. of Germany . |
| 792601 | 9/1956 | United Kingdom . |
| 929179 | 9/1960 | United Kingdom . |
| 1072435 | 8/1964 | United Kingdom . |
| 1379099 | 1/1975 | United Kingdom . |
| 1392795 | 4/1975 | United Kingdom . |

*Primary Examiner*—Douglas C. Butler
*Attorney, Agent, or Firm*—John T. O'Halloran; Alfred C. Hill

[57] ABSTRACT

A brake shoe for a spot-type disc brake includes a carrier plate composed of several plates lying on top of one another, a backing plate and a friction pad secured to one surface of the backing plate. One surface of the carrier plate adjacent the friction pad includes flanges at the ends thereof to embrace the backing plates and the other surface of the carrier plate remote from the friction pad includes flanges to engage a supporting member of a brake housing to transmit the circumferential force at the friction pad during braking to the supporting member.

10 Claims, 5 Drawing Figures

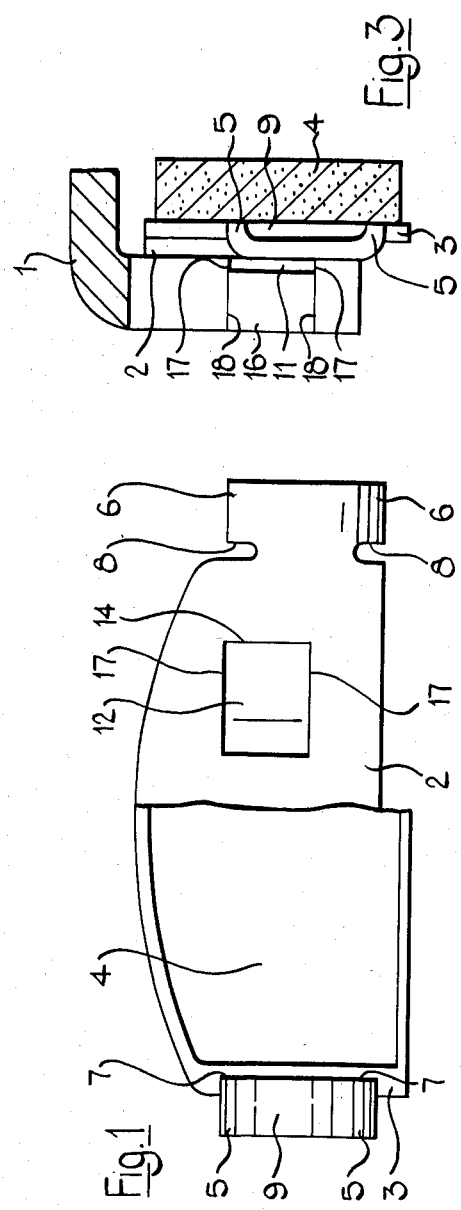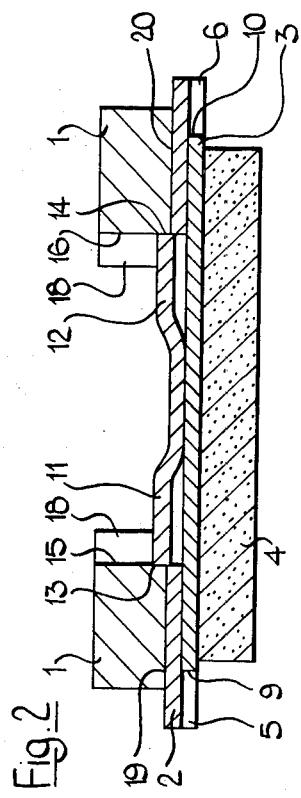

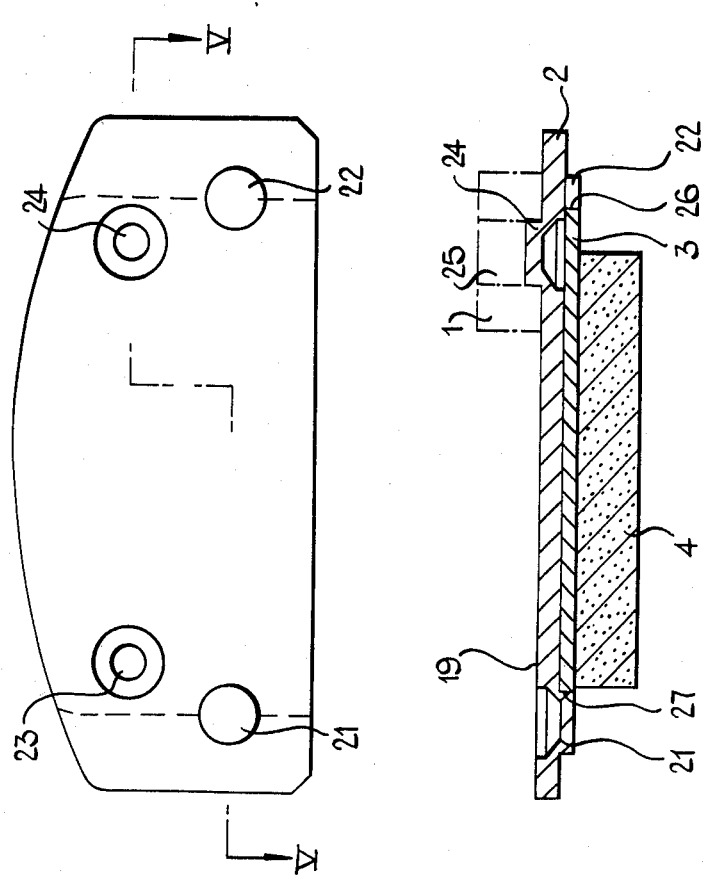

BRAKE SHOE FOR A SPOT-TYPE DISC BRAKE

BACKGROUND OF THE INVENTION

The present invention relates to a brake shoe for a spot-type disc brake, in particular for motor vehicles, including a carrier plate fastened to the brake housing composed of several plates lying on top of one another, and a backing plate carrying the friction pad having the peripheral ends embraced by flanges of the carrier plate which serves for the transmission of the circumferential force generated at the friction pad during braking to the brake housing.

Brake shoes of this type are used with spot-type disc brakes in order to abate the noisy friction vibrations generated with some friction materials during the application of the brake or to prevent the formation thereof. Often foils or thin plates of a vibration-absorbing material are placed between the plates of the pad carrier.

From the German Utility Patent (Dt-GM) No. 7,537,546 a brake shoe of the above type is known which is received in a pad guide of a brake housing, the pad guide transmitting the circumferential force to the brake housing. In this arrangement, both the friction pad and the carrier plate are supported by the pad guide walls surrounding the brake shoe, and consequently the flanges of the carrier plate being exposed to pressure only. For the radial support of the brake shoe in the pad guide, the end of the carrier plate which extends beyond the friction pad is provided with bores engaged by positioning pins fastened in the brake housing. The positioning pins penetrate all plates of the carrier plate so that also the radial retaining forces are directly transmitted to the positioning pins without any stress being imposed on the flanges of the carrier plate. Such a brake shoe is only suited for the installation in a pad guide with the walls thereof providing direct support for the lateral surfaces of the friction pad and carrier plate.

SUMMARY OF THE INVENTION

An object of the present invention is to provide a brake shoe of the type referred to above which allows easy manufacture and which is suitable for fastening to and being supported on a supporting member, such as the arm of a brake caliper, on the side of the carrier plate remote from the friction pad.

A feature of the present invention is the provision of a brake shoe for a spot-type disc brake comprising: a carrier plate; a backing plate having a friction pad secured to one surface thereof, the other surface of the backing plate resting against one surface of the carrier plate; a supporting member of a brake housing; first flanges adjacent the ends of the one surface of the carrier plate engaging end surfaces of the backing plate in a vertical relation to the one surface of the carrier plate and receiving circumferential forces from the friction pad during braking; abutting surfaces provided on the other surface of the carrier plate extending from adjacent the ends of the carrier plate inward to a point adjacent the vertical end surface of the backing plate, the abutting surfaces abutting against the supporting member; and second flanges formed in the other surface of the carrier plate, end faces of the second flanges in a vertical relation to the other surface of the carrier plate engaging the supporting member to transmit the circumferential forces to the supporting member.

A particular advantage of the brake shoe of the present invention is the easy manufacture thereof which is achieved by the fact that the backing plate may be made completely plane so that the pressing of the friction pad onto the backing plate is possible without any special modifications of the conventional equipment. The more complicated shaping is limited to one component, the carrier plate. The required number of expensive bending, embossing or stamping equipment thus can remain small. A further advantage of the brake shoe of the present invention is the fact that, thanks to the formation of the abutment surfaces for the supporting member near the ends of the carrier plate, the bending moment caused at the flanges by the transmission of the circumferential force from the backing plate to the carrier plate can largely be absorbed by the supporting member so that the carrier plate may be manufactured from relatively thin sheet material.

An advantageous embodiment of the present invention includes having the front faces of the flanges of the carrier plate which serve for the transmission of the circumferential force to the supporting member extending in opposite directions from each other. This results in a reduction of the bending of the carrier plate since, in this embodiment of the brake shoe, the bending moment caused by the transmission of the circumferential force is opposed to the bending moment caused by the abutment of the flexible friction pad and the carrier plate.

An advantageous embodiment of the flanges includes the forming of the flanges by parts of the carrier plate embossed out of the plane of the carrier plate in parallel, the flanges advantageously projecting beyond the plane of the plate by an amount corresponding to the thickness of the carrier plate. In such an embodiment the flanges are easily manufacturable by means of stamping or embossing and are characterized by a high resistance against deformations. According to a further advantageous embodiment of the invention, the flanges may be formed by square lugs sheared off at three sides from the carrier plate and pressed out of the plane of the plate. Such an embodiment of the flanges requires a relatively small deformation force. According to another embodiment of the invention, a resistant embodiment of the flanges can be manufactured in an advantageous manner by forming the flanges from bent portions of the rims of the carrier plate, the bending edge running in parallel with the circumferential force. In order to keep to close manufacturing tolerances the flanges are preferably designed as round pivots engaging into mating recesses in the supporting member of the brake housing or in the backing plate. The manufacture of such flanges preferably is realized by way of extrusion. In order to achieve a sufficient radial connection of the plates of the carrier plate, the lateral surfaces of the backing plate are preferably provided with recesses engaged by the flanges of the carrier plate.

BRIEF DESCRIPTION OF THE DRAWING

Above-mentioned and other features and objects of this invention will become more apparent by reference to the following description taken in conjunction with the accompanying drawing, in which:

FIG. 1 is a front view of one embodiment of a brake shoe in accordance with the principles of the present invention;

FIG. 2 is a side view of the brake shoe of FIG. 1;

FIG. 3 is a sectional view of the brake shoe of FIG. 1;

FIG. 4 is a front view of another embodiment of a brake shoe in accordance with the principles of the present invention; and FIG. 5 is a sectional view taken along line V—V of FIG. 4.

DESCRIPTION OF THE PREFERRED EMBODIMENT

The brake shoe illustrated in FIGS. 1 through 3 is provided for fastening to and support at an arm 1 aligned in parallel with the brake disc (not shown) and belonging to a floating caliper which straddles the edge of the brake disc from the outside in a U-shaped manner. The brake shoe includes a carrier plate 2, a backing plate 3 and a friction pad 4. The friction pad 4 has been manufactured by having been pressed onto the backing plate 3 and has been glued to the latter.

The carrier plate 2 has flanges 5 and 6 at its ends which, with respect to the brake disc, extend in the tangential direction. Flanges 5 and 6 point towards the brake disc and embrace backing plate 3 from outside. For transmission of the circumferential force at friction pad 4, generated upon the application of the brake, to arm 1, backing plate 3 will be supported at the lateral front faces 7 or 8 of flanges 5 or 6, respectively, depending on the direction of rotation of the brake disc. Backing plate 3 will be radially secured in its position by means of recesses 9 and 10 in the lateral surfaces of backing plate 3 which are engaged by flanges 5 and 6, respectively. Flanges 5 and 6 thus ensure a positive connection between backing plate 3 and carrier plate 2 which will transmit all the forces generated on a plane parallel with the brake disc.

A corresponding connection is provided between carrier plate 2 and arm 1 of the floating caliper. The connection is provided by flanges 11 and 12 bent out of carrier plate 2 whose front faces 13 and 14 extend in an opposite direction from each other. Faces 13 and 14 abut against the bottom surfaces 15 and 16 of grooves located in arm 1. Flanges 11 and 12 are of a square shape and project from the surface of plate 2 by an amount slightly less than the thickness of plate 2. Flanges 11 and 12 thus will remain joined to carrier plate 2 at all sides so that they can exert a high resistance against pressure and bending stresses. The radial support of carrier plate 2 in arm 1 will be effected by the lateral surfaces 17 of flanges 11 and 12 which are abutting against the side walls 18 of the grooves in arm 1.

In order to prevent any bending of flanges 5 and 6 away from backing plate 3 under the action of the circumferential force generated upon the application of the brake, carrier plate 2 is provided with abutment surfaces 19 and 20 for arm 1 of the brake caliper which extend tangentially beyond the front faces 9 and 10 of flanges 5 and 6 towards the ends of carrier plate 2. Thereby flanges 5 and 6 will be supported by arm 1 so that they will be capable of exerting a considerably increased resistance against the circumferential force.

The embodiment illustrated in FIGS. 1 through 3 may also be modified to the effect that flanges 5 and 6 are not manufactured by bending of the rim portions of carrier plate 2 but rather, similar to flanges 11 and 12, by being formed by square lugs pressed out of the plane of plate 2 whose confronting surfaces provide a support for backing plate 3.

In the embodiment illustrated in FIGS. 4 and 5, the flanges 21 and 22 for the support of backing plate 3 and the flanges 23 and 24 for the support of carrier plate 2 on arm 1 are formed by round pivots projecting from the respective plate surfaces. FIG. 5 illustrates a section taken through the brake shoe along the line V—V of FIG. 4. FIG. 4 is a view of the side of carrier plate 2 facing backing plate 3. The contours of the backing plate have been represented by means of dotted lines. Arm 1 of the floating caliper is not illustrated in FIG. 4. The pivot-like flanges 21 through 24 have been manufactured by displacing the material of carrier plate 2 into a bore of a forming tool corresponding to the desired pivot shape. The material was displaced by a die having the shape of a truncated cone, the head of which was producing corresponding indentations in carrier plate 2 on the side remote from flanges 21 through 24. For the reception of flanges 23 and 24, arm 1 has bores 25, the surface areas of the flanges 23 and 24 abutting against the ends thereof. On its lateral surfaces 26, backing plate 3 is provided with semi-circular recesses engaged by flanges 21 and 22.

Primarily, the use of the inventive brake shoe will be expedient in order to counteract the formation of braking noises. To that end, it is additionally possible to provide an intermediate plate or a foil of silencing material between carrier plate 2 and backing plate 3. The inventive brake shoe, however, also allows the use of a uniform friction shoe manufactured from backing plate 3 and friction pad 4 for a multitude of different brake calipers, the various carrier plates 2 each time forming an adapter by means of which the uniform friction shoe support will be adapted to the various shapes of the brake caliper arms.

While we have described above the principles of our invention in connection with specific apparatus it is to be clearly understood that this description is made only by way of example and not as a limitation to the scope of our invention as set forth in the objects thereof and in the accompanying claims.

We claim:
1. A brake shoe for a spot-type disc brake comprising:
a carrier plate;
a backing plate having a friction pad secured to one surface thereof, said other surface of said backing plate resting against one surface of said carrier plate;
a supporting member of a brake housing;
first flanges adjacent the ends of said one surface of said carrier plate engaging end surfaces of said backing plate in a vertical relation to said one surface of said carrier plate and receiving circumferential forces from said friction pad during braking;
abutting surfaces provided on the other surface of said carrier plate extending from adjacent the ends of said carrier plate inward to a point adjacent said vertical end surface of said backing plate, said abutting surfaces abutting against said supporting member; and
second flanges formed in said other surface of said carrier plate, end faces of said second flanges in a vertical relation to said other surface of said carrier plate engaging said supporting member to transmit said circumferential forces to said supporting member.

2. A brake shoe according to claim 1, wherein said end faces of said second flanges extend in opposite directions to each other.

3. A brake shoe according to claim 2, wherein said first and second flanges are formed by parts of said carrier plate embossed in parallel out of the plane of said carrier plate.

4. A brake shoe according to claim 3, wherein said first and second flanges project beyond the plane of said carrier plate by an amount approximately equal to the thickness of said carrier plate.

5. A brake shoe according to claim 4, wherein said second flanges are formed by square lugs sheared off at three sides from said carrier plate and pressed out of the plane of said carrier plate.

6. A brake shoe according to claim 5, wherein said first flanges are formed by bent portions of the periphery edge of said carrier plate, the bending edge being in parallel relationship with said circumferential force.

7. A brake shoe according to claim 6, wherein said backing plate includes recesses engaged by said first flanges.

8. A brake shoe according to claim 1, wherein said first flanges are formed as round pivots which engage mating recesses in said backing plate, and said second flanges are formed as round pivots which engage mating recesses in said supporting member.

9. A brake shoe according to claim 8, wherein all of said round pivots are formed by extrusion.

10. A brake shoe according to claim 8, wherein said round pivots project beyond the plane of said carrier plate by an amount approximately equal to the thickness of said carrier plate.

* * * * *